No. 778,175.

Patented December 20, 1904.

UNITED STATES PATENT OFFICE.

LEOPOLD HEINRICH DEHOFF, OF MANNHEIM, AND GUSTAV WESSBECHER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

COMPOUND DYE.

SPECIFICATION forming part of Letters Patent No. 778,175, dated December 20, 1904.

Application filed June 14, 1904. Serial No. 212,572.

*To all whom it may concern:*

Be it known that we, LEOPOLD HEINRICH DEHOFF, doctor of philosophy and chemist, a subject of the King of Saxony, residing at Mannheim, in the Grand Duchy of Baden, Germany, and GUSTAV WESSBECHER, chemist, a subject of the Grand Duke of Hesse, residing at Ludwigshafen-on-the-Rhine, in the Kingdom of Bavaria, Germany, have invented new and useful Improvements in a New Composition of Matter, of which the following is a specification.

Our invention relates to a new solid composition of matter which consists of a mixture of dyestuffs with or without the addition of a solid diluent and which possesses valuable properties for the dyeing of wool.

It is well known that coloring-matters of the acid violet and alkali violet classes—that is, the sulfo-acids of alkylated, benzylated, or arylated rosanilins or pararosanilins—are not destroyed when treated on the fiber with a chromate and can therefore be used for dyeing wool in conjunction with other coloring-matters which require to be subsequently treated on the fiber with a chromate. By this means it is possible to produce a better shade than that which can be obtained by the employment of the latter coloring-matters alone. This process, however, has not been used technically to any great extent on account of the small stability of the triphenyl-methane coloring-matters compared with that of the chromed coloring-matters. For instance, the beautiful blue shade which is produced by using a mixture of two and a half parts of alizarin-black WX extra and one and a half parts of alkali violet 4BN after exposure to light for about three months turns gray and shabby, owing to the fading of the alkali violet. We have now discovered that mixtures of one or more of such sulfo-acids of rosanilin derivatives with certain ortho-hydroxy-azo-beta-naphthol coloring-matters possess specially valuable properties, for after being treated on the fiber with a chromate they produce from blue to blue-black shades which are sufficiently fast against the action of acids, washing, and milling and which also possess an excellent fastness against the action of light.

The ortho-hydroxy-azo-beta-naphthol coloring-matters which are particularly suitable for use in the preparation of our new composition of matter are Palatine chrome-black (produced from one molecular proportion of ortho-ortho-dichlor-diamido-phenol sulfo-acid and two molecular proportions of beta-naphthol) and the coloring-matter obtainable from 1.2.4-naphthylamin-disulfo-acid and beta-naphthol, as described in the specifications of the applications for British Letters Patent No. 27,372 of 1903 and No. 4,997 of 1904, and also the coloring-matter obtainable from 6-nitro-2-amido-phenol-4-sulfo-acid and beta-naphthol, as described in the specification of Letters Patent No. 667,935, and for our invention these three coloring-matters are equivalents, and what we wish to be understood as claiming, generically, is the composition of matter containing one or more of these equivalent compounds and one or more sulfo-acids of rosanilin derivatives. Further, we desire to claim this composition of matter by itself and also when fixed on the fiber.

Of course, as will be readily understood by persons skilled in the art, it is not departing from the nature of our invention if the composition of matter contain, in addition to the coloring-matters, a solid diluent, such as Glauber salt, which may be of use in assisting the fixation of the coloring-matters on the fiber, and, further, if instead of the above-mentioned ortho-hydroxy-azo-beta-naphthol coloring-matters in the pure form mixtures containing one or more of these coloring-matters as the essential ingredient or ingredients—such, for instance, as the mixture acid alizarin-black R of the Farbwerke Höchst—be employed.

The following examples will serve to further illustrate the nature of our invention, which, however, is not confined to these examples. The parts are by weight.

*Example 1—Preparation of the new composition of matter.*—Mix together two and a half (2.5) parts of Palatine chrome-black and one and a half (1.5) parts of alkali violet 4BN. This mixture can be used alone or it may be mixed with twenty (20) parts of Glauber salt. In this example instead of the alkali violet 4BN an equal weight of acid violet 4BL can be employed.

*Example 2—Application of the new composition of matter to the dyeing of wool.*—For the preparation of the dye-bath use three thousand (3,000) parts of water and precipitate the lime from this by means of from half a part (0.5) to two (2) parts of ammonium oxalate. Then add a solution of four (4) parts of the concentrated composition of matter prepared as described in Example 1 and also twenty (20) parts of Glauber salt. Put in the bath one hundred (100) parts of wool which has been previously wetted and boil the whole for from fifteen (15) to thirty (30) minutes, and after the greater part of the coloring-matter has been used up add from three (3) to five (5) parts of acetic acid in one (1) or two (2) portions, in the latter case allowing about fifteen (15) minutes to elapse between the additions of the separate portions. Then boil for about thirty (30) minutes, and if the coloring-matter has been sufficiently used up then add a solution of about one and a half (1.5) parts of potassium chromate and boil for from thirty (30) to forty-five (45) minutes. Then cool and wash the wool. In this example it is of course the same thing if instead of using four (4) parts of the concentrated composition of matter and twenty (20) parts of Glauber salt twenty-four (24) parts of the diluted composition of matter as described in Example 1 be employed. Further, instead of alkali violet 4BN other coloring-matters of a similar nature can be employed—such, for instance, as alkali violet 6B, acid violet 4BL, acid violet 7B, acid violet 4B extra Elberfeld, or formyl violet S4B Cassella, all of which are included in the generic term "sulfo-acid of a rosanilin derivative."

Now what we claim is—

1. The new solid composition of matter consisting of an ortho-hydroxy-azo-beta-naphthol coloring-matter and a sulfo-acid of a rosanilin derivative, all substantially as hereinbefore described.

2. The new solid composition of matter consisting of Palatine chrome-black and a sulfo-acid of a rosanilin derivative.

3. The new solid composition of matter consisting of Palatine chrome-black, a sulfo-acid of a rosanilin derivative and a solid diluent.

4. The new solid composition of matter consisting of Palatine chrome-black a sulfo-acid of a rosanilin derivative and Glauber salt.

5. The new solid composition of matter consisting of Palatine chrome-black and alkali violet 4BN.

6. The new solid composition of matter consisting of Palatine chrome-black, alkali violet 4BN and a solid diluent.

7. The new solid composition of matter consisting of Palatine chrome-black, alkali violet 4BN and Glauber salt.

In testimony whereof we have hereunto set our hands in the presence of two subscribing witnesses.

LEOPOLD HEINRICH DEHOFF.
GUSTAV WESSBECHER.

Witnesses:
JOSEPH H. SEUTE,
J. ALEC. LLOYD.